US009969455B2

(12) United States Patent
Kwag et al.

(10) Patent No.: US 9,969,455 B2
(45) Date of Patent: May 15, 2018

(54) FRAME FOR BIKE AND ELECTRIC BIKE HAVING THE SAME

(71) Applicants: SAMSUNG SDI CO., LTD., Yongin-si, Gyeonggi-do (KR); Alton Sports Co., Ltd., Seoul (KR)

(72) Inventors: Nohyun Kwag, Yongin-si (KR); Byungyong Choi, Changwon-si (KR)

(73) Assignees: SAMSUNG SDI CO., LTD., Yongin-si, Gyeonggi-do (KR); ALTON SPORTS CO., LTD., Seoul (KR)

( * ) Notice: Subject to any disclaimer, the term of this patent is extended or adjusted under 35 U.S.C. 154(b) by 0 days. days.

(21) Appl. No.: 14/934,198

(22) Filed: Nov. 6, 2015

(65) Prior Publication Data
US 2016/0152294 A1 Jun. 2, 2016

(30) Foreign Application Priority Data
Nov. 28, 2014 (KR) ........................ 10-2014-0168876

(51) Int. Cl.
*B62K 11/02* (2006.01)
*B62K 3/02* (2006.01)
(Continued)

(52) U.S. Cl.
CPC ........... *B62K 11/02* (2013.01); *B60L 11/1877* (2013.01); *B62K 19/02* (2013.01);
(Continued)

(58) Field of Classification Search
CPC ........ B62K 11/02; B62K 19/02; B62K 19/30; B62K 19/40; B60L 1/1877; B62D 21/15; E04C 3/08; E04C 2003/043
See application file for complete search history.

(56) References Cited

U.S. PATENT DOCUMENTS 2,189,719 A * 2/1940 Wallace ................. B62D 21/02
280/781
3,622,171 A * 11/1971 Gottschalk ............. B62D 21/02
280/797
(Continued)

FOREIGN PATENT DOCUMENTS

CN 202201108 U 4/2012
CN 202320650 U 7/2012
(Continued)

OTHER PUBLICATIONS

Extended European Search Report dated Apr. 7, 2016.

*Primary Examiner* — Joseph M Rocca
*Assistant Examiner* — Marlon A Arce
(74) *Attorney, Agent, or Firm* — Lee & Morse, P.C.

(57) ABSTRACT

A frame for a bike with a plurality of frame units coupled to each other, at least one of the plurality of frame units includes a hollow chamber, and a first partition wall that partitions the hollow chamber into a first chamber unit and a second chamber unit, wherein the first chamber unit includes an opening in a first side of the first chamber unit and an accommodation space to accommodate a battery pack, and wherein the second chamber unit includes a plurality of holes through a first side of the second chamber unit, an interior of the second chamber unit and an exterior of the frame for the bike being in fluid communication through the plurality of holes.

18 Claims, 13 Drawing Sheets

(51) Int. Cl.
*E04C 3/08* (2006.01)
*B62K 19/30* (2006.01)
*B62K 19/40* (2006.01)
*B60L 11/18* (2006.01)
*B62K 19/02* (2006.01)
*B62D 21/15* (2006.01)
*E04C 3/04* (2006.01)

(52) U.S. Cl.
CPC .............. *B62K 19/30* (2013.01); *B62K 19/40* (2013.01); *E04C 3/08* (2013.01); *B62D 21/15* (2013.01); *B62K 2204/00* (2013.01); *E04C 2003/043* (2013.01)

(56) References Cited

U.S. PATENT DOCUMENTS

| | | | | |
|---|---|---|---|---|
| 3,763,950 | A * | 10/1973 | Rockwell | B60K 13/06 180/309 |
| 5,255,932 | A * | 10/1993 | Moore | B62K 19/10 280/281.1 |
| 5,363,625 | A * | 11/1994 | Philippi | E04L 31/5831 403/252 |
| 6,029,353 | A * | 2/2000 | Cowan | B62K 19/06 29/412 |
| 6,068,330 | A * | 5/2000 | Kasuga | B62D 21/15 188/377 |
| 7,147,238 | B2 * | 12/2006 | Oi | B62J 6/18 280/281.1 |
| 7,441,830 | B2 * | 10/2008 | Caliskan | B62D 25/08 280/788 |
| 7,815,000 | B2 * | 10/2010 | Kisse | B62D 21/186 180/9.1 |
| 7,934,576 | B2 | 5/2011 | Munksoe | |
| 7,988,175 | B2 * | 8/2011 | White | B62J 9/001 224/425 |
| 2004/0250503 | A1 * | 12/2004 | Bigelow | B64G 1/22 52/838 |
| 2011/0115192 | A1 | 5/2011 | Helms et al. | |

FOREIGN PATENT DOCUMENTS

| | | |
|---|---|---|
| CN | 202896780 U | 4/2013 |
| CN | 103523133 A | 1/2014 |
| CN | 203553235 U | 4/2014 |
| CN | 203612151 U | 5/2014 |
| CN | 203937794 U | 11/2014 |
| DE | 202008009933 U1 | 10/2008 |
| EP | 1504987 A1 | 2/2005 |
| EP | 2572970 A1 | 3/2013 |
| EP | 2653371 A1 | 10/2013 |
| EP | 2998212 A1 | 3/2016 |

* cited by examiner

FRAME FOR BIKE AND ELECTRIC BIKE HAVING THE SAME

CROSS-REFERENCE TO RELATED APPLICATION

Korean Patent Application No. 10-2014-0168876, filed on Nov. 28, 2014, in the Korean Intellectual Property Office, and entitled: "Frame for Bike and Electric Bike Having the Same," is incorporated by reference herein in its entirety.

BACKGROUND

1. Field

One or more exemplary embodiments relate to frames for bikes and electric bikes having the same.

2. Description of the Related Art

Due to the problems related to alternative energy and environmental pollution, concerns about electric bikes that can replace a part of the existing transportation means using fossil fuel and that require less force than existing hand-operated bikes are greatly increasing. Battery packs having rechargeable secondary batteries are widely used as devices for supplying power to electric bikes, e.g., these battery packs can be mounted on the electric bikes.

SUMMARY

One or more exemplary embodiments include frames for bikes and electric bikes having the same.

According to one or more exemplary embodiments, there is provided a frame for a bike with a plurality of frame units coupled to each other, at least one of the plurality of frame units includes a hollow chamber, and a first partition wall that partitions the hollow chamber into a first chamber unit and a second chamber unit, wherein the first chamber unit includes an opening in a first side of the first chamber unit and an accommodation space to accommodate a battery pack, and wherein the second chamber unit includes a plurality of holes through a first side of the second chamber unit, an interior of the second chamber unit and an exterior of the frame for the bike being in fluid communication through the plurality of holes.

The frame unit may include: a first outer sidewall and a second outer sidewall that face each other; and a third outer sidewall and a fourth outer sidewall that connect the first outer sidewall to the second outer sidewall and face each other, and the hollow chamber may be defined by the first through fourth outer sidewalls.

The second chamber unit may include at least one rib that extends in a lengthwise direction of the second chamber unit, and the second chamber unit may be partitioned into a plurality of areas by the at least one rib.

Each of the plurality of areas may have a hole through which each of the plurality of areas is fluidically connected to the outside of the frame for the bike.

The first partition wall may include a plurality of holes through which each of the plurality of areas of the second chamber unit is fluidically connected to the first chamber unit.

The at least one frame unit may further include a second partition wall that partitions the hollow chamber to form a third chamber unit that is on an opposite side of the second chamber unit with the first chamber unit interposed between the second chamber unit and the third chamber unit.

The second partition wall may be substantially parallel to the first partition wall and may face the first partition wall.

A first sidewall of the first chamber unit having the opening formed therein may be disposed substantially perpendicular to the first partition wall and the second partition wall.

The third chamber unit may include at least one rib that extends in a lengthwise direction of the third chamber unit, and the third chamber unit may be partitioned into a plurality of areas by the at least one rib.

The second partition wall may include a plurality of holes through which each of the plurality of areas of the third chamber unit is fluidically connected to the first chamber unit.

The third chamber unit may include a plurality of holes through which each of the plurality of areas and the outside of the frame for the bike are fluidically connected to each other.

According to one or more exemplary embodiments, there is provided an electric bike including: a front wheel and a rear wheel; a driving portion that drives the rear wheel; an electromotion portion that is electrically connected to a battery pack, converts electric energy of the battery pack into kinetic energy, and drives at least one of the rear wheel and the driving portion; and a frame in which a plurality of frame units are coupled to each other, wherein at least one of the plurality of frame units may include: a first chamber unit having an opening formed in one side of the first chamber unit and an accommodation space where the battery pack inserted through the opening is accommodated; and a second chamber unit that is on one side of the first chamber unit, wherein an outer sidewall of the second chamber unit may include a hole through which the inside of the second chamber unit and the outside of the at least one frame unit are fluidically connected to each other.

The opening may face away from the ground, and the second chamber unit may be adjacent to the ground.

The electric bike may further include a third chamber unit that is on an opposite side of the second chamber unit with the first chamber unit interposed between the second chamber unit and the third chamber unit.

The first chamber unit and the second chamber unit may be adjacent to each other, wherein a first partition wall may be interposed between the first chamber unit and the second chamber unit, and the second chamber unit may include at least one rib that extends in a lengthwise direction of the second chamber unit.

The second chamber unit may be partitioned into a plurality of areas by the at least one rib, and the second chamber unit may include holes which correspond to the plurality of areas and through which each of the plurality of areas is fluidically connected to the outside of the frame.

The first chamber unit and the third chamber unit may be adjacent to each other, wherein the second partition wall may be interposed between the first chamber unit and the third chamber unit, and the third chamber unit may include at least one rib that extends in a lengthwise direction of the third chamber unit.

The third chamber unit may be partitioned into a plurality of areas by the at least one rib, and the second partition wall may include a plurality of holes through which the plurality of areas of the third chamber unit and the first chamber unit are fluidically connected to each other.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
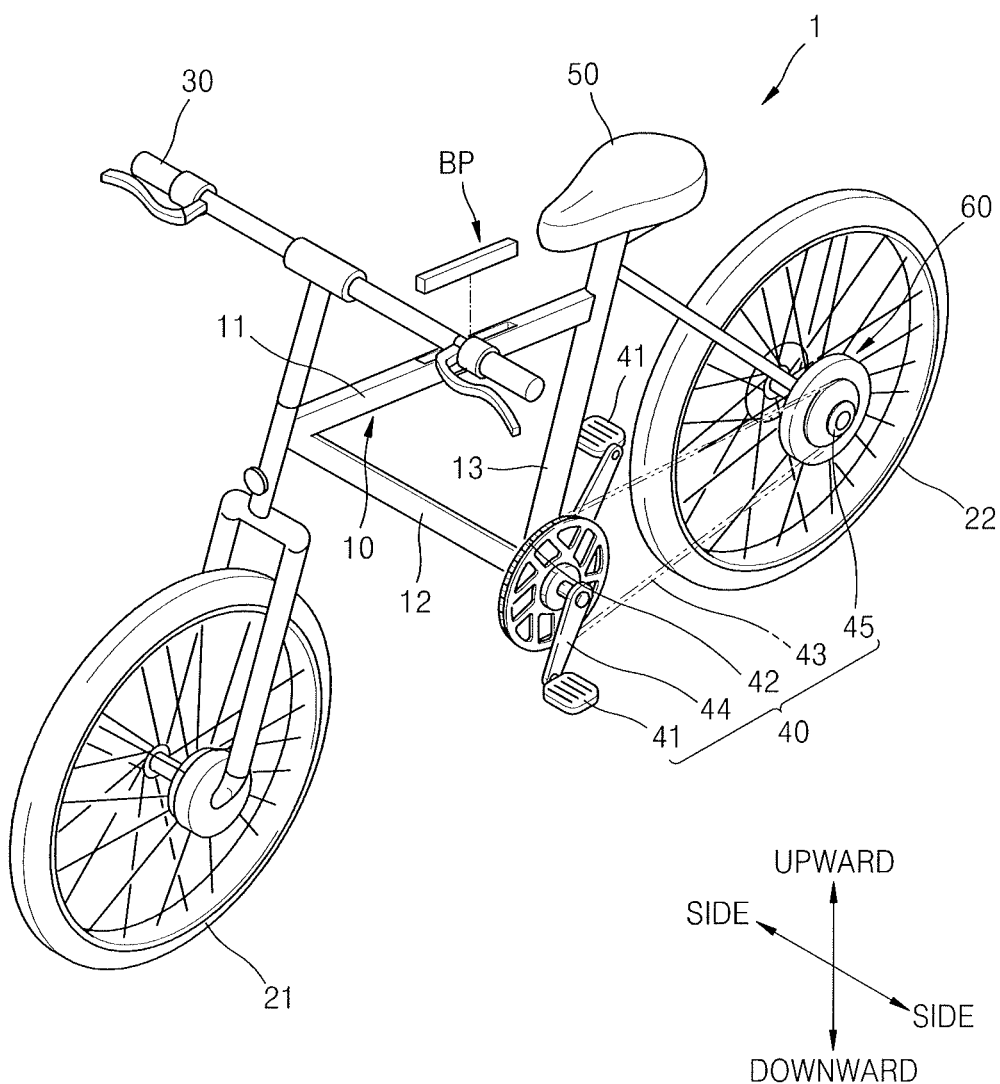
FIG. 1 illustrates a perspective view of an electric bike according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when an element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

When a certain embodiment may be implemented differently, a specific process order may be performed differently from the described order. For example, two consecutively described processes may be performed substantially at the same time or performed in an order opposite to the described order.

It will be understood that when a layer, region, or component is connected to another layer, region, or component, it can be directly or indirectly connected to the other layer, region, or component. That is, for example, intervening layers, regions, or components may be present. As used herein, the term "and/or" includes any and all combinations of one or more of the associated listed items. Expressions such as "at least one of," when preceding a list of elements, modify the entire list of elements and do not modify the individual elements of the list.

FIG. 1 is a perspective view of an electric bike 1 according to an exemplary embodiment.

Referring to FIG. 1, an electric bike 1 according to the exemplary embodiment may include a frame 10, a front wheel 21, a rear wheel 22, a steering portion 30, a driving portion 40, a seat 50, and an electromotion portion 60. The front wheel 21 and the rear wheel 22 are rotatably supported on the frame 10.

The driving portion 40 may include a pedal 41, a chain wheel 42, a chain 43, and a driven wheel 45. The pedal 41 may be connected to the chain wheel 42 using a crank arm 44. A pair of pedals 41 is positioned to be symmetrical about the chain wheel 42, and when a rider pushes the pair of pedals 41 to rotate the chain wheel 42, the driven wheel 45 is rotated by the chain 43. Since the driven wheel 45 is connected to the rear wheel 22, the rear wheel 22 rotates when the driven wheel 45 rotates.

The electromotion portion 60 may include a motor and a gearbox. In some embodiments, the motor is rotated by power applied from a battery pack BP. When the motor rotates, the chain wheel 42 of the driving portion 40 connected to the motor rotates. As the chain wheel 42 rotates, the driven wheel 45 is rotated by the chain 43 so that the rear wheel 22 may rotate.

As above, a driving force generated by the electromotion portion 60 is supplied to the driving portion 40. However, embodiments are not limited thereto. In another exemplary embodiment, the driving force generated by the electromotion portion 60 may be supplied to at least one of the front wheel 21, the rear wheel 22, and the driving portion 40.

In some embodiments, the electric bike 1 may be moved by one of the driving portion 40 and the electromotion portion 60 according to a rider's selection. For example, when the rider selects a manual mode, the electric bike 1 may be moved by an operation of the driving portion 40, and when the rider selects an automatic mode, the electric bike 1 may be moved by an operation of the electromotion portion 60. When the rider selects an auto-assist mode, the electric bike 1 may be moved by an operation of the driving portion 40 and the electromotion portion 60.

The frame 10 may be formed when a plurality of frame units, e.g., first, second, and third frame units 11, 12, and 13, are coupled to each other. In some embodiments, the frame 10 may have a structure in which the first frame unit 11, the second frame unit 12, and the third frame unit 13 are coupled, as illustrated in FIG. 1. The seat 50, on which the rider sits, may be disposed on the frame 10.

The battery pack BP may be accommodated in the first frame unit 11 that is one of the first, second, and third frame units 11, 12, and 13. The battery pack BP may be accommodated inside the first frame unit 11 through an opening formed in an upper portion of the first frame unit 11.

FIG. 1 illustrates a case where the battery pack BP is accommodated in the first frame unit 11. However, embodiments are not limited thereto. In another exemplary embodiment, the battery pack BP may be accommodated in the second frame unit 12 or the third frame unit 13.

Hereinafter, a frame unit, in which the battery pack BP is accommodated, will be described with reference to FIGS. 2 through 5.

Figure 2:
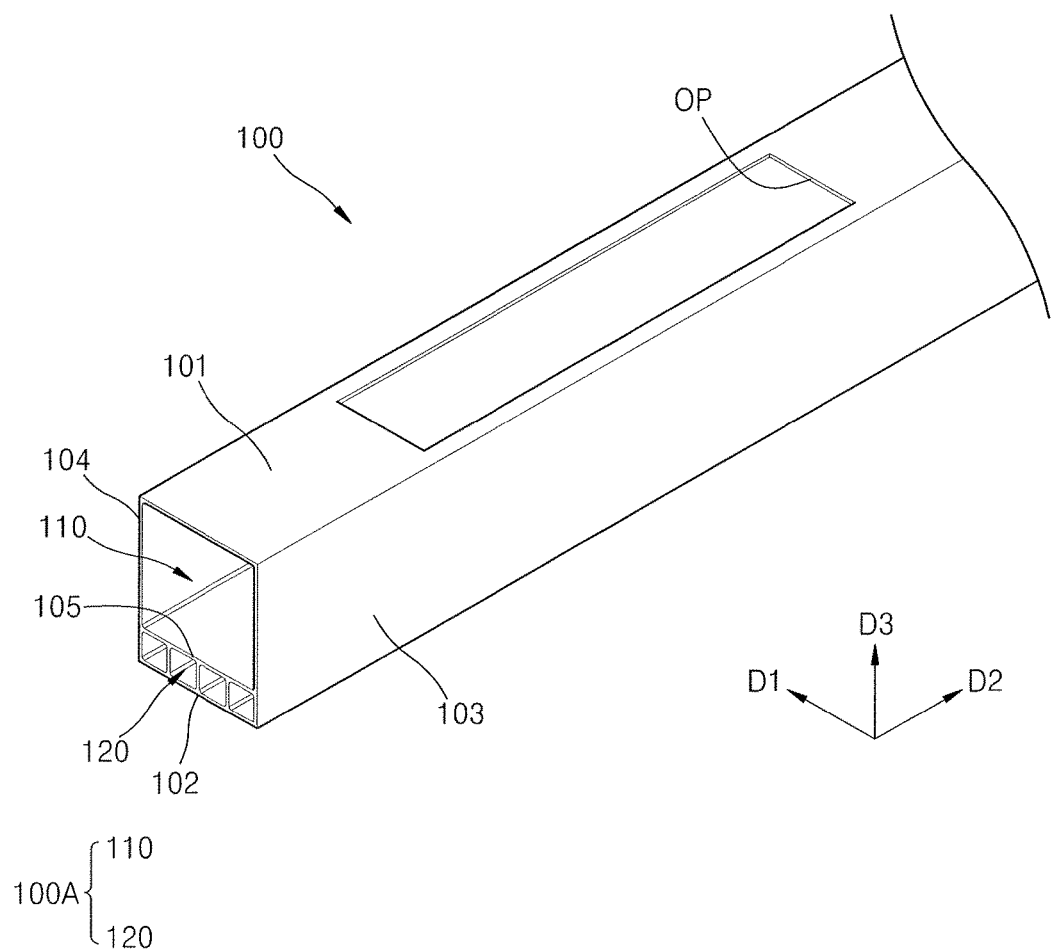
FIG. 2 illustrates a perspective view of a part of a frame unit according to an exemplary embodiment.
Figure 3:
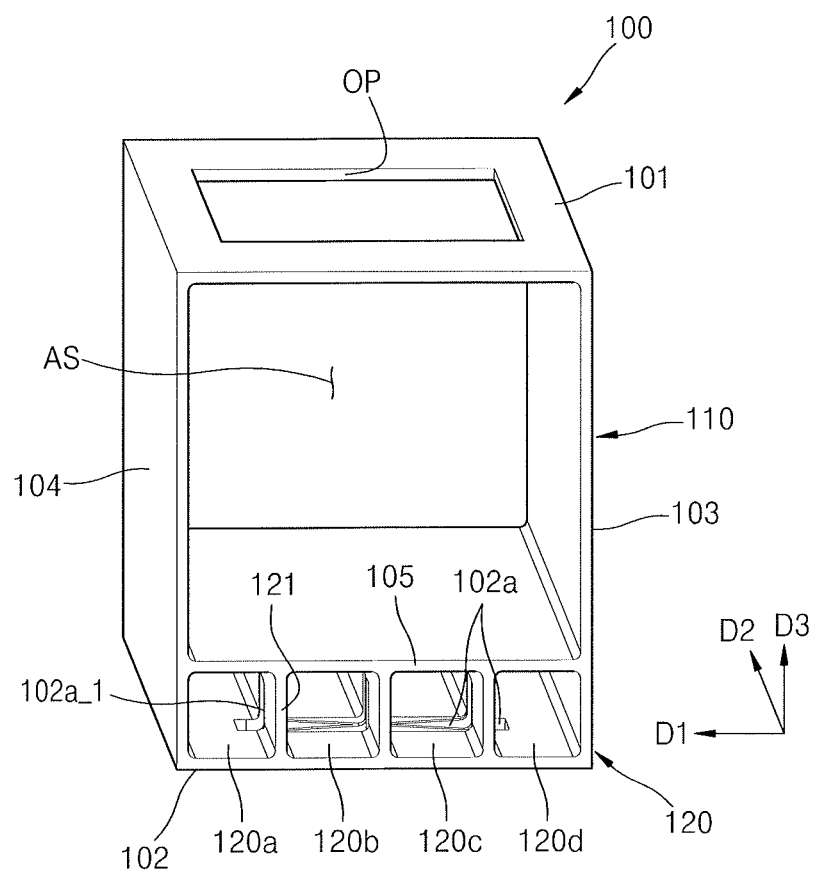
FIG. 3 illustrates a perspective view of the frame unit of FIG. 2 from a different angle.

FIG. 2 is a perspective view of a part of a frame unit according to an exemplary embodiment, and FIG. 3 is a perspective view of the frame unit of FIG. 2 from a different angle.

Referring to FIGS. 2 and 3, a frame unit 100 accommodating the battery pack BP may have, e.g., an approximately square pillar shape that is, a hollow chamber 100A, the inside of which is empty and which is defined by first and second outer sidewalls 101 and 102 that face each other and third and fourth outer sidewalls 103 and 104 that face each other and connect the first and second outer sidewalls 101 and 102 to each other. Each of the first through fourth outer sidewalls 101, 102, 103, and 104 may be formed as a flat surface or a curved surface. The inside of the hollow chamber 100A is divided into a first chamber unit 110 and a second chamber unit 120 by a first partition wall 105.

The first chamber unit 110 has an accommodation space AS in which the battery pack BP is accommodated. The first chamber unit 110 includes an opening OP formed in one of the sidewalls of the first chamber unit 110, e.g., the opening OP may face away from the ground (i.e., in an upward direction of the electric bike 1). The battery pack BP may be accommodated inside the first chamber unit 110 through the opening OP or may be separated from the first chamber unit 110 to the outside. For example, the first chamber unit 110 may have a fixing structure in which the position of the battery pack BP accommodated through the opening OP may be fixed. It is noted that the opening OP in FIG. 3 is not to scale, and is illustrated merely to indicate position thereof relative to other elements of the frame unit 100.

The second chamber unit 120 is on one side of the first chamber unit 110. In some embodiments, the second chamber unit 120 may be on an opposite side to one of the sidewalls of the first chamber unit 110. For example, the second chamber unit 120 may be on an opposite side to the first outer sidewall 101 of the first chamber unit 110 having the opening OP formed therein. When the opening OP faces away from the ground, i.e., in the upward direction of the electric bike 1, the second chamber unit 120 may face the ground, i.e., in a downward direction of the electric bike 1.

The second chamber unit 120 may include at least one rib 121 that extends, e.g., continuously, in a lengthwise direction of the, e.g., entire, second chamber unit 120, e.g., along the D2 direction. In some embodiments, the at least one rib 121 may extend in the lengthwise direction of the second chamber unit 120 and may connect the second outer sidewall 102 and the first partition wall 105 to each other, e.g., along the D3 direction, so that the rigidity of the second chamber unit 120 may be maintained. For example, the at least one rib 121 may partition the inside of the second chamber unit 120 into a plurality of areas adjacent to each other along the D1 direction, e.g., first to fourth areas 120a to 120d in FIG. 3.

The second chamber unit 120 may have a smaller interior space (or volume) than that of the first chamber unit 110. The second chamber unit 120 may function as a heat sink that assists the heat dissipation of the battery pack BP when the battery pack BP is accommodated in the first chamber unit 110.

The second chamber unit 120 may include a hole 102a. The hole 102a may be formed in an outer sidewall of the second chamber unit 120, e.g., in the second outer sidewall 102 on an opposite side of the first outer sidewall 101 having the opening OP formed therein. The inside of the second chamber unit 120 may be in fluid communication with to the outside through the hole 102a.

The second chamber unit 120 that is a heat sink may take away, e.g., remove, heat of the battery pack BP that directly contacts the first partition wall 105. The heat removed from the battery pack BP into the second chamber unit 120, e.g., through contact with the first partition wall 105, may be dissipated from the second chamber unit 120, e.g., through air introduced through the hole 102a.

Figure 4A:
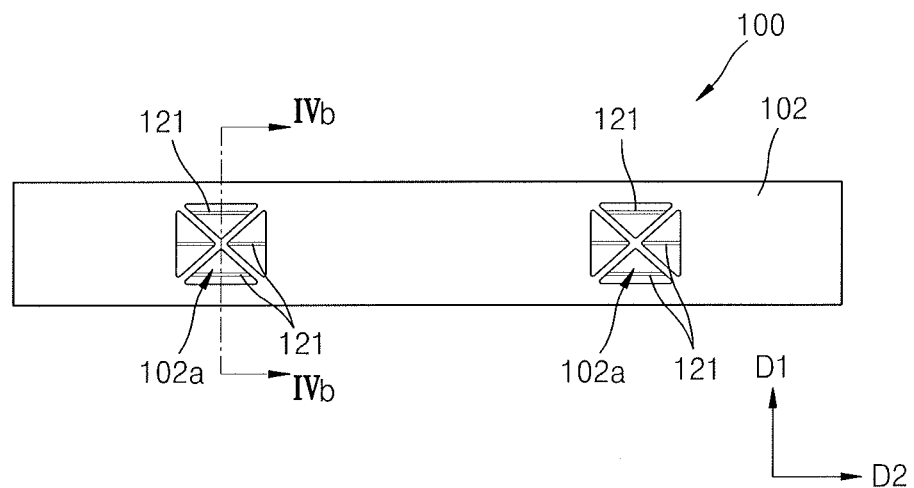
FIG. 4A illustrates a bottom view of the frame unit of FIG. 2.
Figure 4B:
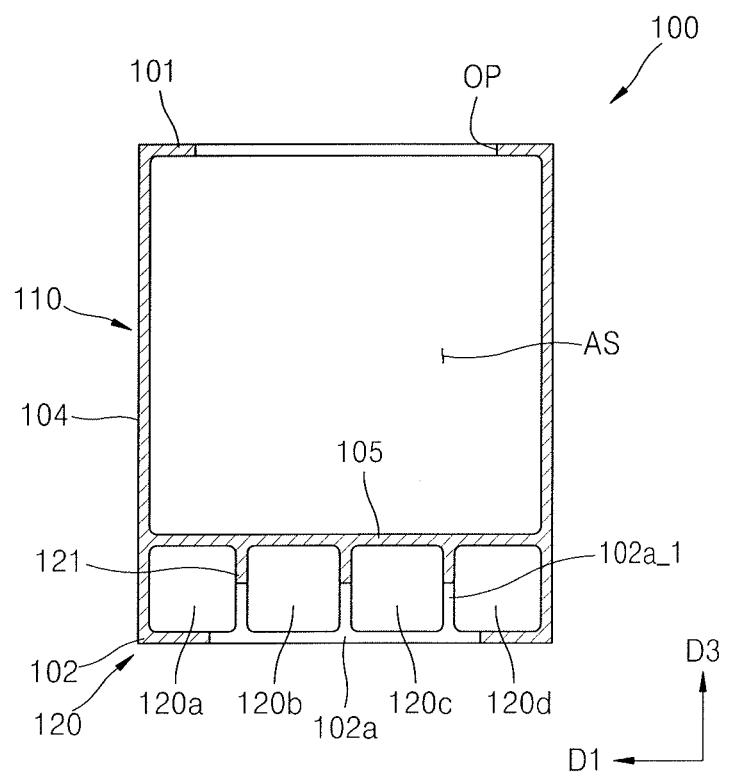
FIG. 4B illustrates a cross-sectional view taken along line IVb-IVb of FIG. 4A.
Figure 5:
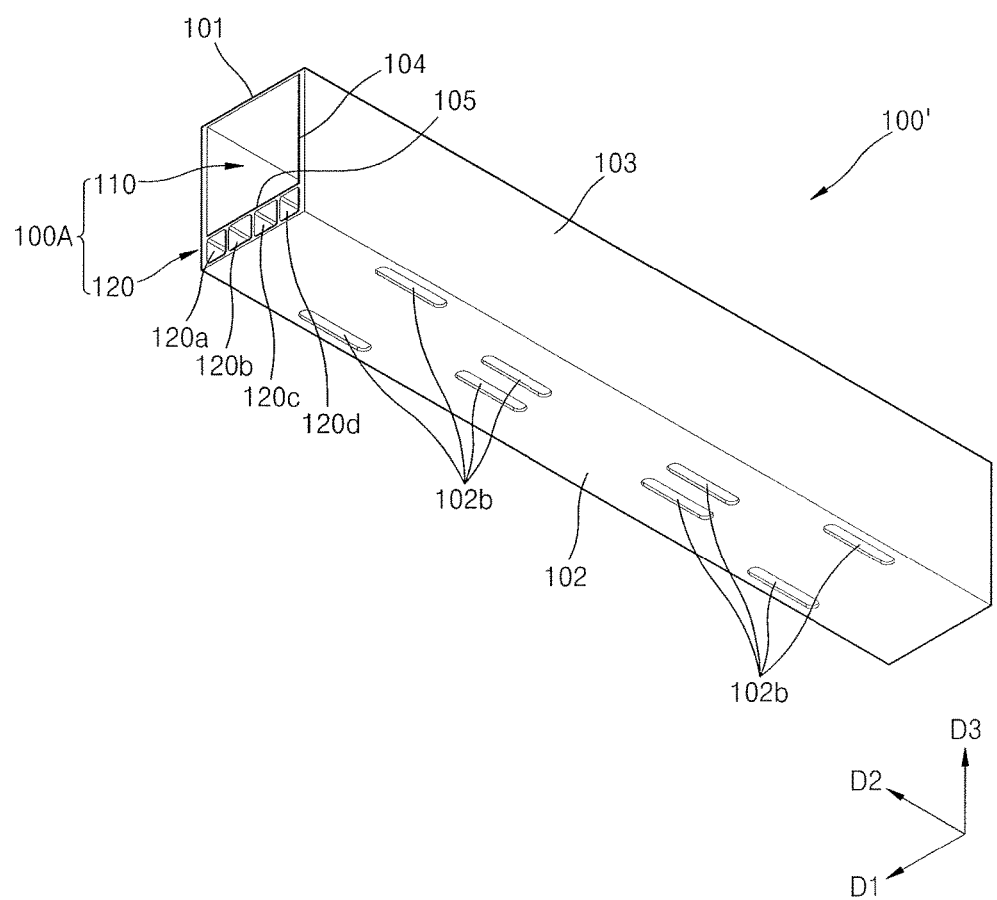
FIG. 5 illustrates a bottom perspective view of a frame unit according to another exemplary embodiment.

In some embodiments, when the inside of the second chamber unit 120 is partitioned into the first to fourth areas 120a to 120d, by the at least one rib 121, the hole 102a may include a plurality of holes 102a. In one embodiment, as illustrated in FIGS. 4A and 4B, the holes 102a may be formed in such a way that some areas among the first to fourth areas 120a to 120d may be simultaneously exposed to the outside through each of the holes 102a, and fluidically connected to the outside. In another embodiment, as illustrated in FIG. 5, at least one hole 102a may be individually formed to correspond to each of the first to fourth areas 120a to 120d. Thus, each of the first to fourth areas 120a, 120b, 120c, and 120d may be fluidically connected to the outside through the holes 120a. Hereinafter, the holes 102a will be described with reference to FIGS. 4A-4B and 5.

FIG. 4A is a bottom view of the frame unit 100. FIG. 4B is a cross-sectional view taken along line IVb-IVb of FIG. 4A. It is noted that FIG. 4B also reflects a cross section of FIG. 3 through the hole 102a.

In detail, referring to FIGS. 4A and 4B, the holes 102a are formed in such a way that some areas among the first to fourth areas 120a to 120d may be simultaneously and fluidically connected to the outside through each of the holes 102a. For example, as illustrated in FIG. 4A, a plurality of holes 102a through the second outer sidewall 102 may be spaced apart from each other along the D2 direction. For example, as further illustrated in FIG. 4A, each hole 102a may include a plurality of sub-openings spaced apart from each other by portions of the second outer sidewall 102, and may be arranged into a polygon, e.g., four triangular sub-openings arranged into a rectangle may be separated from each other by a X-shaped portion of the second outer sidewall 102. For example, as illustrated in FIG. 4B, each hole 102a may simultaneously overlap bottoms of the first to fourth areas 120a to 120d, so the first to fourth areas 120a to 120d may be simultaneously and fluidically connected to the outside through the same hole 102a.

In detail, the inside of the second chamber unit 120 is partitioned into the first to fourth areas 120a, 120b, 120c and 120d by a plurality of ribs 121. For example, as illustrated in FIG. 4B, each one of the plurality of ribs 121 may extend from the first partition wall 105 only partially into the second chamber unit 120 to define openings 102a_1 through sidewalls of adjacent first to fourth areas 120a, 120b, 120c and 120d to connect interior spaces thereof. As such, each hole 102a through the second outer sidewall 102 may be in fluid communication with the openings 102a_1 through the sidewalls of the first to fourth areas 120a, 120b, 120c and 120d, thereby providing simultaneous fluid communication of the first to fourth areas 120a, 120b, 120c and 120d among themselves and with the outside.

In contrast, if the first to fourth areas 120a, 120b, 120c and 120d were to be completely and spatially separate from each other by the ribs 121, e.g., without the openings 102a_1, and if only some of the first to fourth areas 120a, 120b, 120c and 120d were to be fluidically connected to the outside, air in areas not connected to the outside would be in a closed state, i.e., with no air flow. As such, heat dissipation could be insufficient.

However, in the present example embodiment, the first to fourth areas 120a to 120d partitioned by the ribs 121 are simultaneously and fluidically connected to each other and to the outside through the hole 102a. As such, air may be introduced into each of the first to fourth areas 120a, 120b, 120c, and 120d to efficiently increase heat-dissipation.

FIG. 5 is a bottom perspective view of a frame unit according to another exemplary embodiment.

Referring to FIG. 5, a frame unit 100' accommodating a battery pack according to the current embodiment is substantially the same as the frame unit 100 described above with reference to FIGS. 2 through 4B. Thus, a description of the same elements is the same as above, and a hole 102b will now be described in detail.

Referring to FIG. 5, the hole 102b may be individually formed in first to fourth areas 120a, 120b, 120c, and 120d partitioned by the ribs 121. In other words, at least one hole 102b may be formed in each of the first to fourth areas 120a, 120b, 120c, and 120d. In FIG. 5, each of the first to fourth areas 120a, 120b, 120c, and 120d extends along the D2 direction, and two holes 102b spaced apart from each other along the D2 direction are formed in each of the first to fourth areas 120a, 120b, 120c, and 120d. However, the number of holes 102b to be formed in each area may be changed.

In contrast, if the first to fourth areas 120a, 120b, 120c and 120d were to be completely and spatially separate from each other by the ribs 121, and if only some of the first to fourth areas 120a, 120b, 120c and 120d were to be fluidically connected to the outside, air in areas not connected to the outside would be in a closed state, i.e., with no air flow. As such, heat dissipation could be low.

However, in the present example embodiment, the holes 102b are formed in each of the first to fourth areas 120a, 120b, 120c, and 120d, so each of the first to fourth areas 120a, 120b, 120c and 120d is fluidically connected to the outside through the holes 102b. As such, a flow of air is formed in each of the areas 120a, 120b, 120c, and 120d so that heat-dissipation efficiency may increase.

The holes 102b may be irregularly formed. For example, the pattern of the holes 102b corresponding to the first area 120a may differ from that of the holes 102b corresponding to the second area 120b. In more detail, the positions of the holes 102b corresponding to the first area 120a may be different from those of the holes 102b corresponding to the second area 120b.

As above, a case where the holes 102a and 102b are formed in the second chamber unit 120 has been described with reference to FIGS. 4 and 5. However, embodiments are not limited thereto.

In another exemplary embodiment, although not shown, holes may be formed in the first partition wall 105. Thus, each of the first to fourth areas 120a to 120d partitioned by the ribs 121 may be fluidically connected to the first chamber unit 110. The holes may be formed in the first partition wall 105 in positions corresponding to the holes 102a and 102b formed in the second chamber unit 120.

Figure 6:
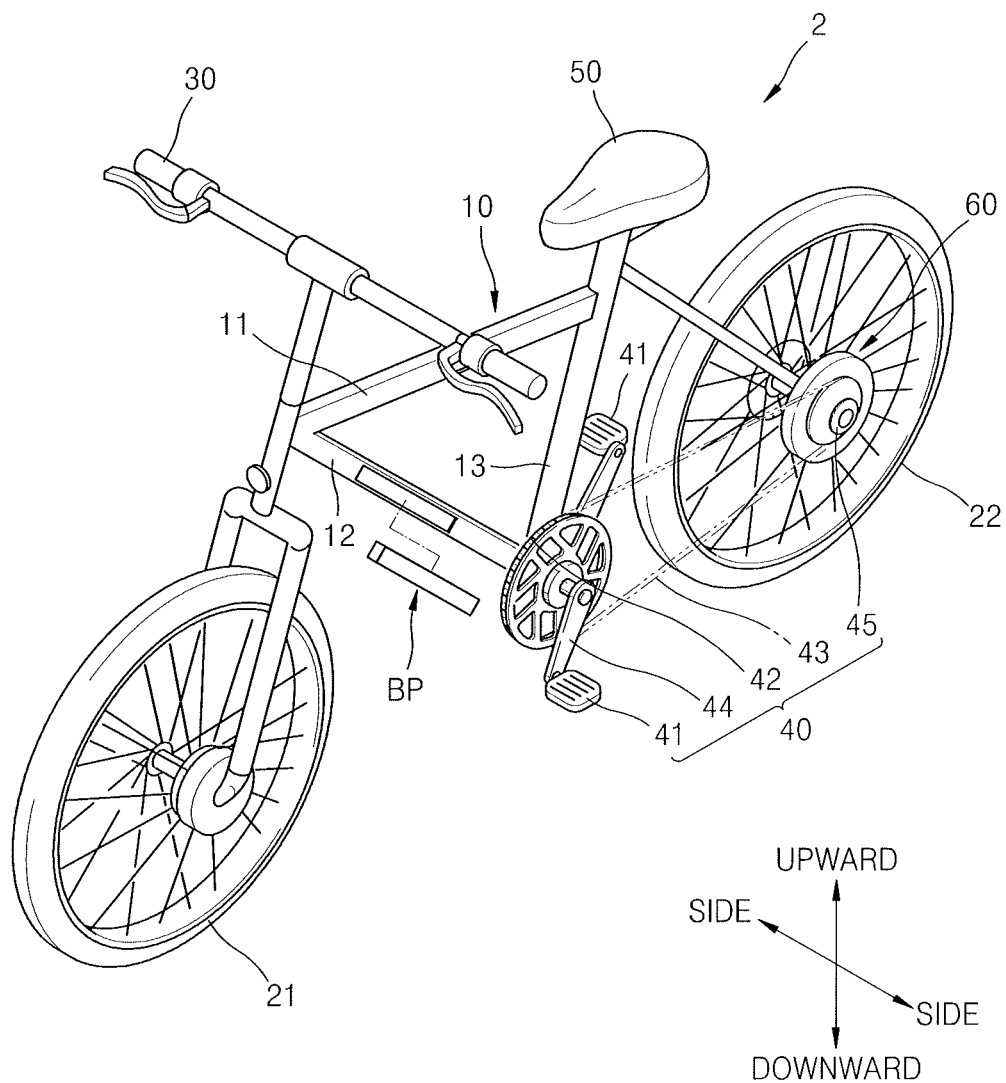
FIG. 6 illustrates a perspective view of an electric bike according to another exemplary embodiment.

FIG. 6 is a perspective view of an electric bike 2 according to another exemplary embodiment.

Referring to FIG. 6, the battery pack BP may be accommodated in a second frame unit 12 that is one of a plurality of frame units, i.e., one of the first through third frame units 11 through 13, that constitute the frame 10 of the electric bike 2. The battery pack BP may be accommodated inside the second frame unit 12 through the opening OP formed in a side of the second frame unit 12.

FIG. 6 illustrates a case where the battery pack BP is accommodated in the second frame unit 12. However, embodiments are not limited thereto. In another exemplary embodiment, the battery pack BP may be accommodated in the first frame unit 11 or the third frame unit 13.

Hereinafter, a frame unit, in which the battery pack BP is accommodated, will be described with reference to FIGS. 7 through 12.

Figure 7:
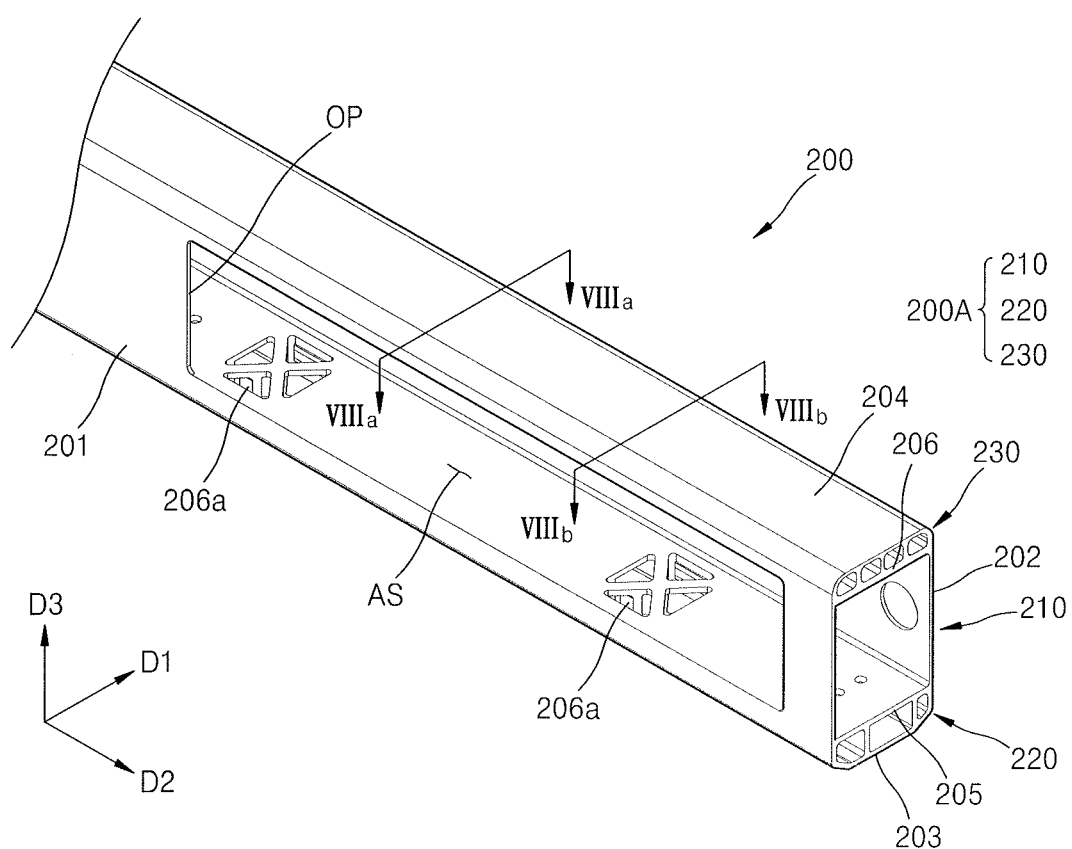
FIG. 7 illustrates a perspective view of a part of a frame unit according to another exemplary embodiment.
Figure 8A:
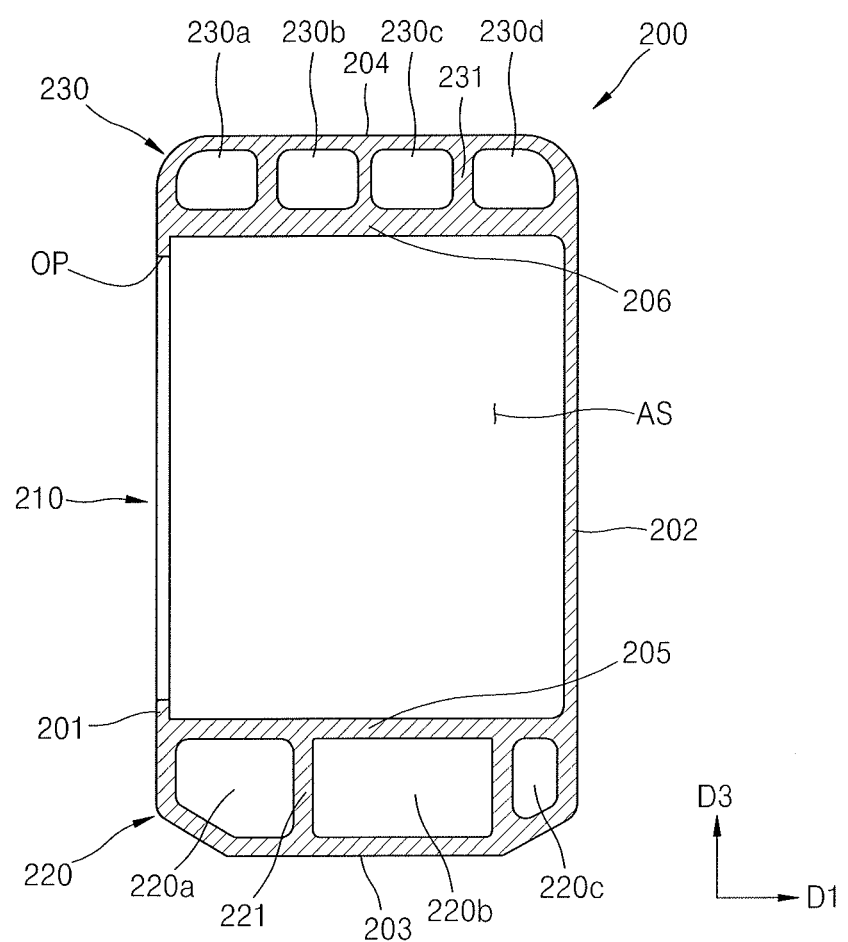
FIG. 8A illustrates a cross-sectional view taken along line VIIIa-VIIIa of FIG. 7.
Figure 8B:
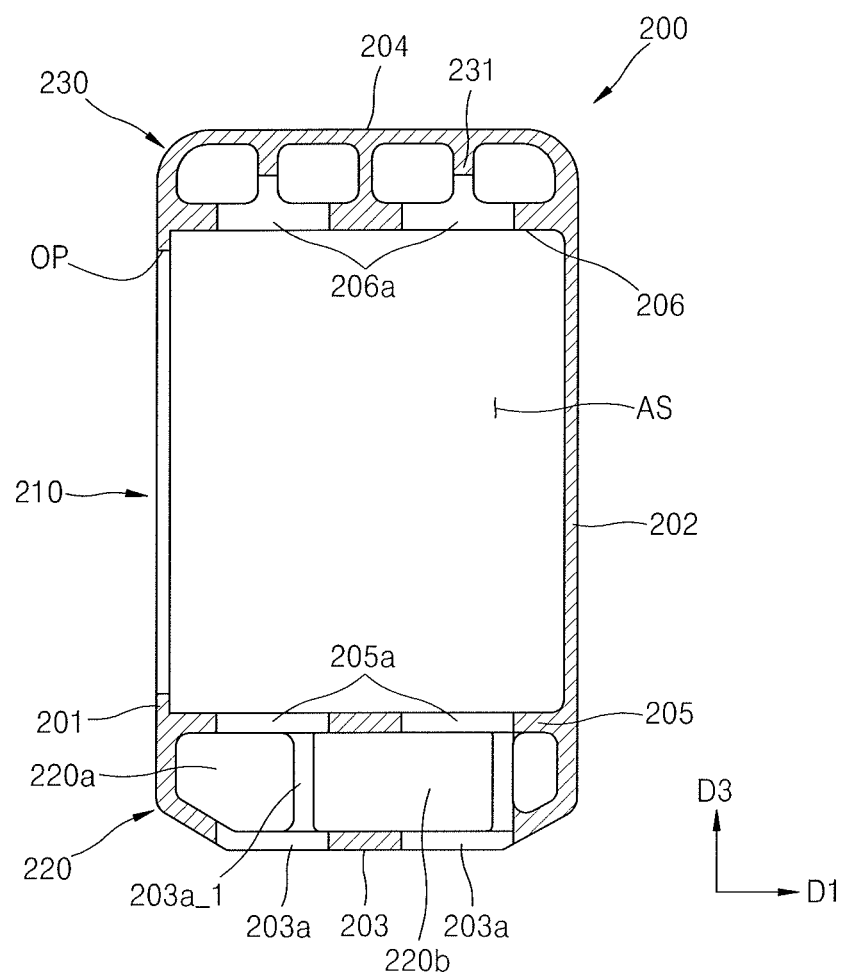
FIG. 8B illustrates a cross-sectional view taken along line VIIIb-VIIIb of FIG. 7.
Figure 9:
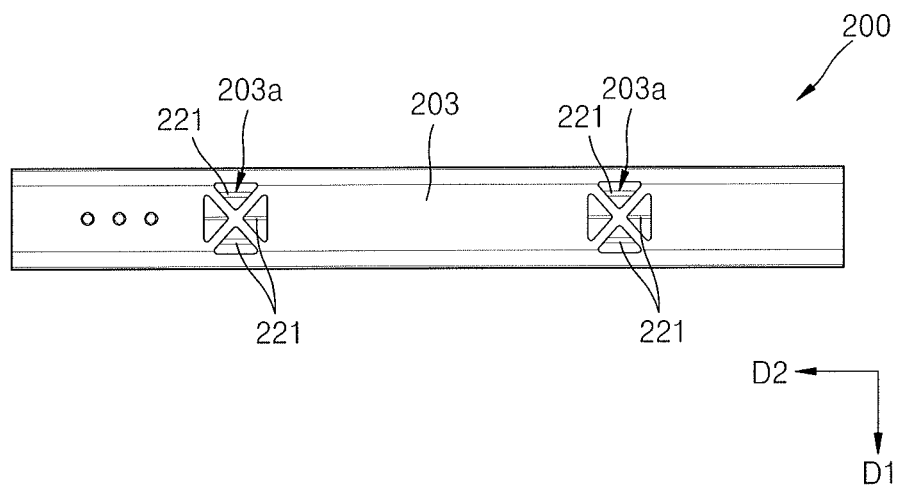
FIG. 9 illustrates a bottom view of the frame unit of FIG. 7.

FIG. 7 is a perspective view of a part of a frame unit according to another exemplary embodiment. FIG. 8A is a cross-sectional view taken along line VIIIa-VIIIa of FIG. 7. FIG. 8B is a cross-sectional view taken along line VIIIb-VIIIb of FIG. 7. FIG. 9 is a bottom view of the frame unit of FIG. 7.

Referring to FIGS. 7, 8A, and 8B, a frame unit 200 may have, e.g., an approximately square pillar shape that is, a hollow chamber 200A, the inside of which is empty and which is defined by first and second outer sidewalls 201 and 202 that face each other, and third and fourth outer sidewalls 203 and 204 that face each other and connect the first and second outer sidewalls 201 and 202 to each other. Each of the first through fourth outer sidewalls 201, 202, 203, and 204 may be formed as a flat surface or a curved surface. The inside of the hollow chamber 200A is divided by a first partition wall 205 and a second partition wall 206 into a first chamber unit 210, a second chamber unit 220, and a third chamber unit 230. The second chamber unit 220 and the third chamber unit 230 are on both sides of the first chamber unit 210 with the first chamber unit 210 between the third and second chamber units 220 and 230.

The first chamber unit 210 has an accommodation space AS in which the battery pack BP is accommodated. The first chamber unit 210 includes the opening OP which faces toward a side direction of the electric bike 2. In other words, the opening OP faces toward a direction parallel to the ground. The battery pack BP may be accommodated inside the first chamber unit 210 through the opening OP or may be separated from the first chamber unit 110 to the outside. The first chamber unit 210 may have a fixing structure in which the position of the battery pack BP accommodated through the opening OP may be fixed.

The second and third chamber units 220 and 230 are positioned on both sides of the first chamber unit 210. The opening OP may be between the second and third chamber units 220 and 230. For example, when the opening OP faces toward the side direction parallel to the ground, i.e., toward the side direction of the electric bike 2, the second chamber unit 220 may be disposed under the first chamber unit 210 along a downward direction, and the third chamber unit 230 may be disposed over the first chamber unit 210 along an upward direction.

The second chamber unit 220 may include at least one rib 221 that extends in a lengthwise direction of the second chamber unit 220, e.g., along the D2 direction, and the third chamber unit 230 may include at least one rib 231 that extends in a lengthwise direction of the third chamber unit 230, e.g., along the D2 direction. For example, as illustrated in FIG. 8A, the ribs 221 and 231 may be separated from each other by the first chamber unit 210.

In some embodiments, at least one rib 221 may extend in the lengthwise direction of the second chamber unit 220 and may connect the third outer sidewall 203 and the first partition wall 205 so that the rigidity of the second chamber unit 220 may be maintained. The inside of the second chamber unit 220 may be partitioned into a plurality of areas, e.g., first to third areas 220a through 220c, by the at least one rib 221. For example, as illustrated in FIGS. 8A and 8B, each one of the plurality of ribs 221 may have an opening 203a_1. Each one of the plurality of ribs 221 may extend from the first partition wall 205 only partially into the second chamber unit 220 to define openings 203a_1 through sidewalls of adjacent first to third areas 220a, 220b and 220c to connect interior spaces thereof. As such, each hole 203a through the third outer sidewall 203 may be in fluid communication with the openings 203a_1 through the sidewalls of the first to third areas 220a, 220b and 220c, thereby providing simultaneous fluid communication of the first to third areas 220a, 220b and 220c among themselves and with the outside.

At least one rib 231 may extend in the lengthwise direction of the third chamber unit 230 and may connect the fourth outer sidewall 204 and the second partition wall 206 so that the rigidity of the third chamber unit 230 may be maintained. The inside of the third chamber unit 230 may be partitioned into a plurality of areas, e.g., first to fourth areas 230a through 230d, by the at least one rib 231.

The second and third chamber units 220 and 230 may be disposed on opposite sides of the first chamber unit 210 so that the entire rigidity of the frame unit 200 may be increased. For example, each of the second and third chamber units 220 and 230 may have a smaller interior space (or volume) than that of the first chamber unit 210.

In some embodiments, an upper sidewall of the third chamber unit 230, e.g., the fourth outer sidewall 204, is a sidewall in which no hole or opening is formed. The fourth outer sidewall 204 may prevent rainwater or snow that falls onto the ground, from penetrating into the electric bike 2.

The second and third chamber units 220 and 230 may function as a heat sink that assists the heat dissipation of the battery pack BP when the battery pack BP is accommodated in the first chamber unit 210. In particular, the third chamber unit 230 may improve heat-dissipation efficiency by performing heat exchange with the outside.

In some embodiments, the second chamber unit 220 that is a heat sink may take away heat of the battery pack BP that directly contacts the first partition wall 205, and heat taken away from the second chamber unit 220 may be dissipated through the third chamber unit 230 itself and/or through air introduced through holes 203a.

In some embodiments, when the inside of the second chamber unit 220 is partitioned into a plurality of areas, e.g., first, second, and third areas 220a, 220b, and 220c, by ribs 221, at least one hole 203a may correspond to some areas among the first to third areas 220a to 220c. Thus, some areas of the first to third areas 220a to 220c may be simultaneously and fluidically connected to the outside through the at least one hole 203a, as will be described in more detail below with reference to FIG. 9.

Referring to FIG. 9, each of the holes 203a is formed in such a way that some areas among the first, second, and third areas 220a, 220b, and 220c may be simultaneously and fluidically connected to the outside through the hole 203a. For example, when the inside of the second chamber unit 220 is partitioned into the first, second, and third areas 220a, 220b, and 220c by a plurality of ribs 221, all of the first, second, and third areas 220a, 220b, and 220c may be fluidically connected to the outside through the holes 203a.

If the first, second, and third 220a, 220b and 220c were to be completely and spatially separate from each other by the ribs 221, and if only some of the first, second, and third 220a, 220b, and 2230c were to be fluidically connected to the outside through the holes 202a, air in areas not connected to the outside would be in a closed state. Therefore, not all areas of the second chamber unit 220 would have air flow therethrough.

However, in the current example embodiment, when the first, second, and third areas 220a, 220b, and 220c partitioned by the ribs 221 are simultaneously and fluidically connected to each other and to the outside through the holes 203a, air may be introduced into each of the first, second, and third areas 220a, 220b, and 220c. Therefore, heat-dissipation efficiency may increase.

The first and second partition walls 205 and 206 may respectively include holes 205a and 206a. The first chamber unit 210 may be spatially connected to the second chamber unit 220 and the third chamber unit 230, respectively, by the holes 205a and 206a.

The holes 205a and 206a may be respectively formed in the first and second partition walls 205 and 206 in positions corresponding to the holes 203a formed in an outer sidewall of the second chamber unit 220, i.e., in the third outer sidewall 203 to have the same pattern. In some embodiments, by using one hole processing device (not shown), the holes 203a in the outer sidewall of the second chamber unit 220, and the holes 205a and 206a of the first and second partition walls 205 and 206 may be formed at the same time.

Figure 10:
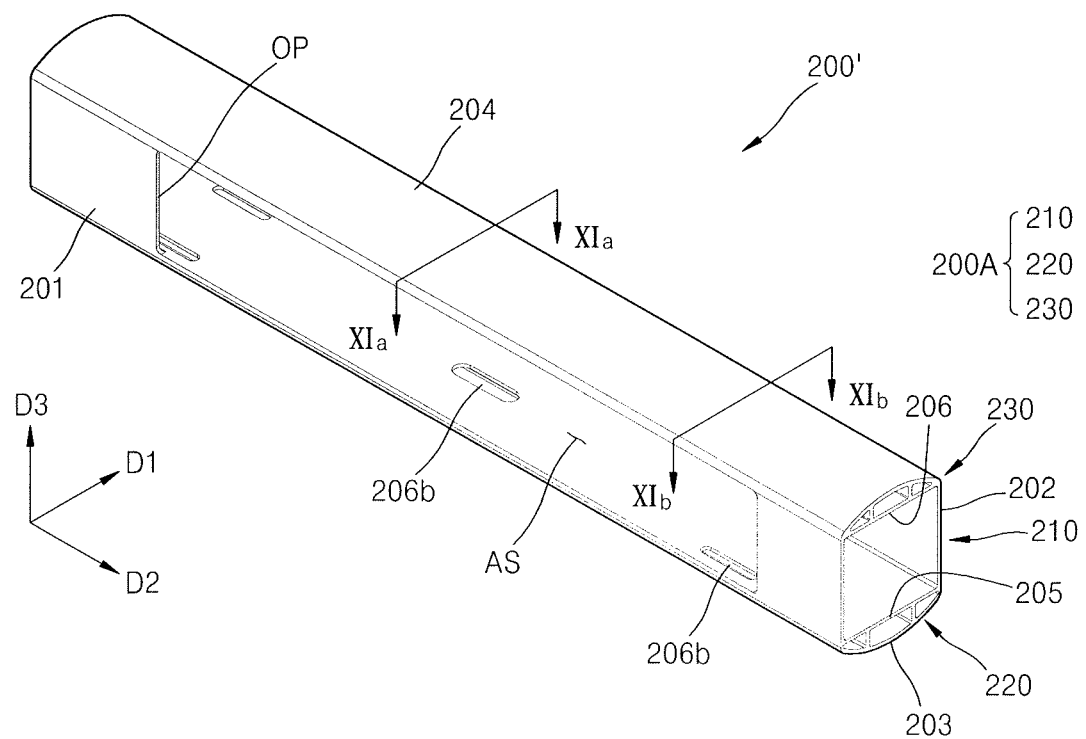
FIG. 10 illustrates a perspective view of a part of a frame unit according to another exemplary embodiment.
Figure 11A:
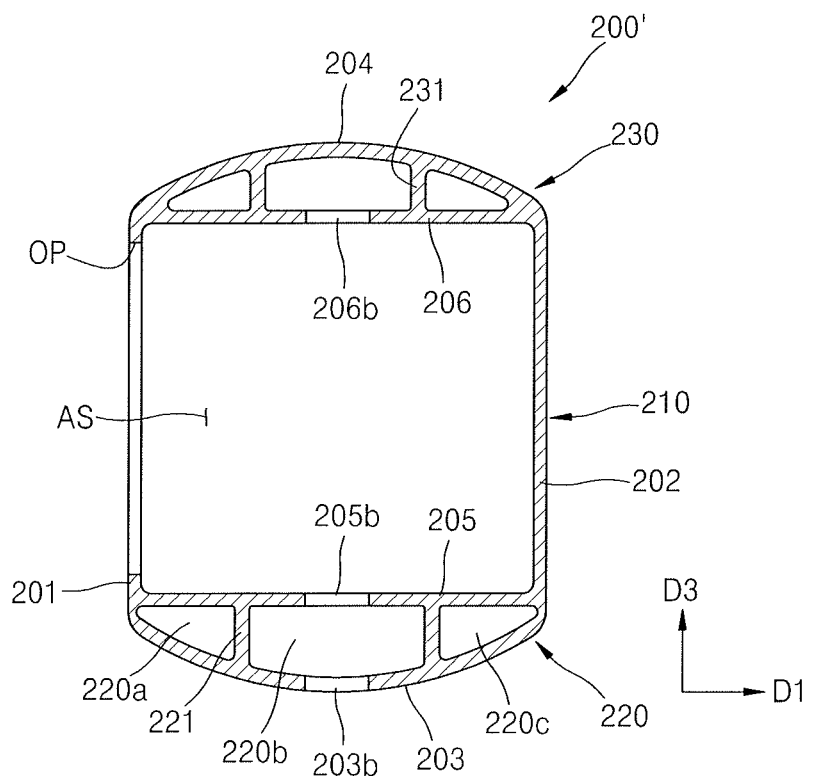
FIG. 11A illustrates a cross-sectional view taken along line XIa-XIa of FIG. 10.
Figure 11B:
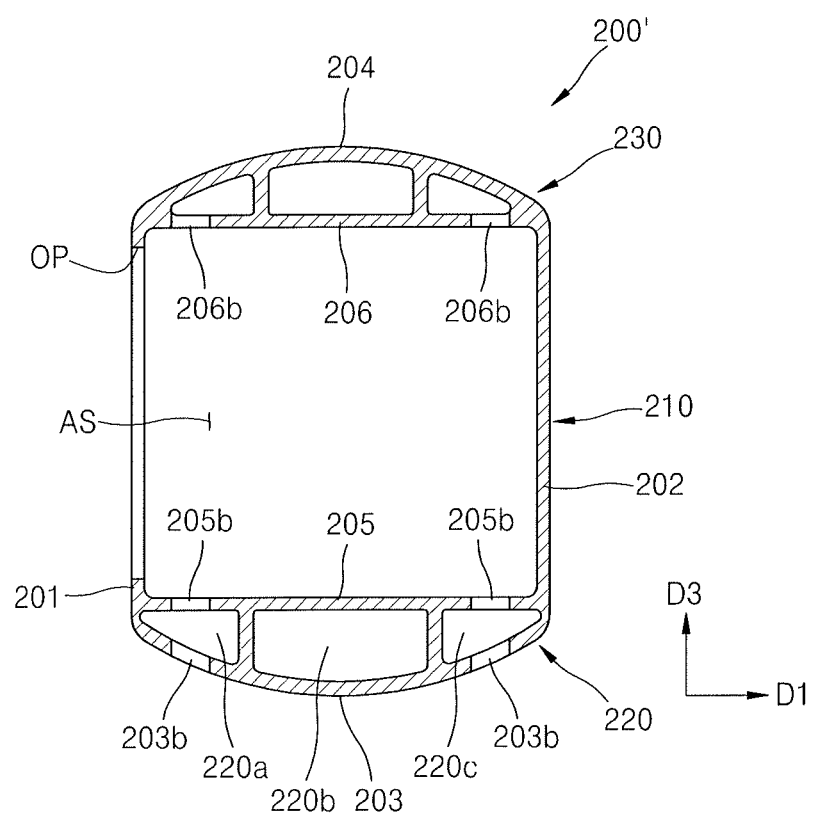
FIG. 11B illustrates a cross-sectional view taken along line XIb-XIb of FIG. 10.
Figure 12:
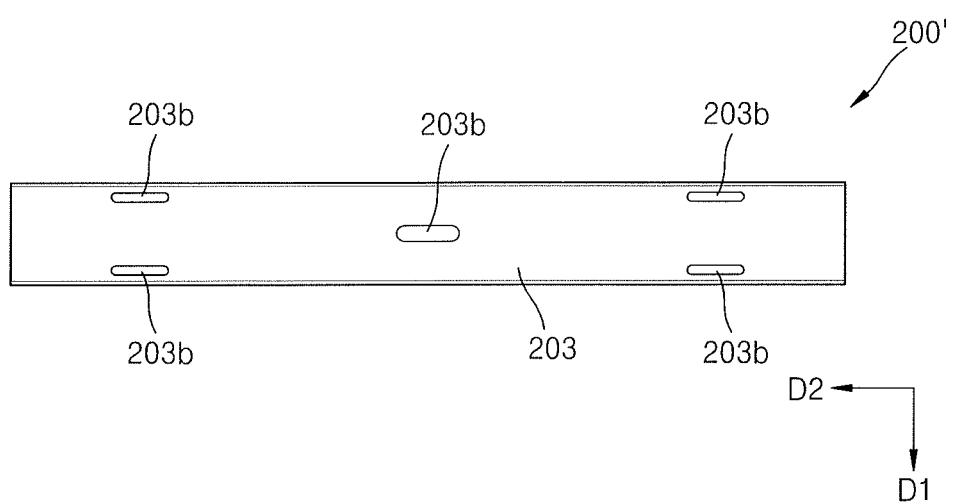
FIG. 12 illustrates a bottom view of the frame unit of FIG. 10.

FIG. 10 is a perspective view of a part of a frame unit according to another exemplary embodiment. FIG. 11A is a cross-sectional view taken along line XIa-XIa of FIG. 10, and FIG. 11B is a cross-sectional view taken along line XIb-XIb of FIG. 10. FIG. 12 is a bottom view of the frame unit of FIG. 10.

Referring to FIGS. 10 through 12, a frame unit 200' accommodating the battery pack BP is substantially the same as the frame unit 200 described above with reference to FIGS. 7 through 9, except for holes 204b formed in a lower portion of the frame unit 200'. Hereinafter, a difference will be described, and a description of the same elements is the same as above.

Referring to FIGS. 10 through 12, the frame unit 200' may have, e.g., an approximately square pillar shape that is, the hollow chamber 200A, the inside of which is empty and which is defined by the first and second outer sidewalls 201 and 202 that face each other, and the third and fourth outer sidewalls 203 and 204 that face each other and connect the first and second outer sidewalls 201 and 202 to each other. The second chamber unit 220 and the third chamber unit 230 include ribs 221 and 231, respectively, and are positioned on both sides of the first chamber unit 210 so that the entire rigidity of the frame unit 200 may increase.

The second and third chamber units 220 and 230 may function as a heat sink that assists the heat dissipation of the battery pack BP when the battery pack BP is accommodated in the first chamber unit 210. In particular, the third chamber unit 230 may dissipate heat generated in the battery pack BP through the third chamber unit 230 and/or through air introduced through holes 203b.

In some embodiments, when the inside of the second chamber unit 220 is partitioned into a plurality of areas, e.g., first, second, and third areas 220a, 220b, and 220c extending along the D2 direction, by ribs 221, the holes 203b may be formed to correspond to each of the first, second, and third areas 220a, 220b, and 220c. As such, each of the first, second, and third areas 220a, 220b and 220c may be fluidically connected to the outside through the holes 203b. In other words, at least one hole 203b may be formed in each of the first, second, and third areas 220a, 220b, and 220c (FIGS. 11A-11B).

If the first, second, and third areas 220a, 220b, and 220c were to be completely and spatially separate from each other by the ribs 221, and if only some of the first, second, and third areas 220a, 220b and 220c were to be exposed through the holes 203b to be fluidically connected to the outside, air in areas not connected to the outside through the holes 203b would be in a closed state. Therefore, there would be some areas with no air flow.

However, in the current example embodiment, since the holes 203b are formed to correspond to each of the first, second, and third areas 220a, 220b and 220c, each of the first, second, and third areas 220a, 220b and 220c is fluidically connected to the outside through the holes 203b, and the flow of air is formed in each of the first, second, and third areas 220a, 220b and 220c. Thus, heat-dissipation efficiency may increase.

The holes 203b may be irregularly formed. For example, the holes 203b corresponding to the first area 220a may have a different pattern from that of the holes 203b corresponding to the second area 220b. That is, positions of the holes 203b corresponding to the first area 220a may be different from positions of the holes 203b corresponding to the second area 220b.

Each of the first and second partition walls 205 and 206 may include holes 205b and 206b. The holes 205b and 206b formed in each of the first and second partition walls 205 and 206 may correspond to the holes 203b of an outer sidewall of the second chamber unit 220, e.g., the third sidewall 204. In this case, by punching holes using one hole processing device (not shown), the holes 203b of the outer sidewall of the second chamber unit 220, and the holes 205a and 205b of the first and second partition walls 205 and 206 may be formed at the same time.

By way of summation and review, bikes are used outdoors. Depending on weather conditions, e.g., when humidity is high and it rains, the bikes may be operated or left alone. For example, when humid air penetrates between the battery pack BP and the frame of the bike, the battery pack BP may be badly affected. However, according to example embodiments, at least one chamber unit 120, 220, and/or 230 is further adjacent to the first chamber units 110 and 210, in which the battery pack BP is accommodated, so that humidity may be prevented from directly affecting the battery pack BP or the effect of humidity may be minimized.

That is, as described above, according to the one or more of the embodiments, in a frame for a bike and an electric bike having the same, heat-dissipation of the battery pack BP may be effectively performed. In other words, a frame for a bike may provide a space for accommodating a battery pack, may dissipate heat generated in the battery pack, may protect the battery pack from humidity and provide sufficient rigidity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A frame for a bike, the frame comprising:
a hollow chamber; and
a first partition wall that partitions the hollow chamber into a first chamber unit and a second chamber unit, the first partition wall including a plurality of openings through which the second chamber unit is in fluid communication with the first chamber unit, wherein:
the first chamber unit includes an opening in a first side of the first chamber unit and an accommodation space to accommodate a battery pack, the first partition wall separating the accommodation space from the second chamber unit,
the second chamber unit includes at least one hole through a first side of the second chamber unit, an interior of the second chamber unit and an exterior of the frame for the bike being in fluid communication through the at least one hole,
the second chamber unit has a second side corresponding to the first partition wall, and
the second chamber unit has at least one rib that extends in a height direction of the second chamber unit, connecting the first side of the second chamber unit to the first partition wall, the at least one rib extending in a lengthwise direction of the second chamber unit, the second chamber unit being partitioned into a plurality of areas by the at least one rib.

2. The frame as claimed in claim 1, comprising:
a first outer sidewall and a second outer sidewall that face each other; and
a third outer sidewall and a fourth outer sidewall that connect the first outer sidewall to the second outer sidewall and face each other, the hollow chamber being defined by the first through fourth outer sidewalls.

3. The frame as claimed in claim 1, wherein each of the plurality of areas is in fluid communication with the exterior of the frame through the at least one hole.

4. The frame as claimed in claim 1, wherein the first partition wall includes a plurality of openings through which each of the plurality of areas of the second chamber unit is in fluid communication with the first chamber unit.

5. The frame as claimed in claim 1, further comprising a second partition wall that partitions the hollow chamber to include a third chamber unit, the first chamber unit being between the second chamber unit and the third chamber unit.

6. The frame as claimed in claim 5, wherein the second partition wall is substantially parallel to the first partition wall and faces the first partition wall.

7. The frame as claimed in claim 6, wherein a first sidewall of the first chamber unit having the opening therein is perpendicular to the first partition wall and the second partition wall.

8. The frame as claimed in claim 5, wherein the third chamber unit includes at least one rib that extends in a lengthwise direction of the third chamber unit, the third chamber unit being partitioned into a plurality of areas by the at least one rib.

9. The frame as claimed in claim 8, wherein the second partition wall includes a plurality of openings, the plurality of areas of the third chamber unit being in fluid communication with the first chamber unit through the plurality of openings.

10. The frame as claimed in claim 9, wherein the third chamber unit includes a plurality of openings through which each of the plurality of areas and the exterior of the frame are in fluid communication with each other.

11. An electric bike, comprising:
a front wheel and a rear wheel;
a driving portion that drives the rear wheel;
an electromotion portion that is electrically connected to a battery pack, converts electric energy of the battery pack into kinetic energy, and drives at least one of the rear wheel and the driving portion; and
a frame, the frame including:
a hollow chamber; and
a first partition wall that partitions the hollow chamber into a first chamber unit and a second chamber unit, the first partition wall including a plurality of openings through which the second chamber unit is in fluid communication with the first chamber unit, wherein:
the first chamber unit includes an opening in a first side of the first chamber unit and an accommodation space to accommodate a battery pack, the first partition wall separating the accommodation space from the second chamber unit, and
the second chamber unit includes at least one hole through a first side of the second chamber unit, an interior of the second chamber unit and an exterior of the frame for the bike being in fluid communication through the at least one hole, the battery pack being in the accommodation space.

12. The electric bike as claimed in claim 11, wherein the opening faces away from a ground, the second chamber unit being adjacent to the ground.

13. The electric bike as claimed in claim 11, wherein the frame further comprises a third chamber unit, the first chamber unit being between the second chamber unit and the third chamber unit.

14. The electric bike as claimed in claim 13, wherein the first chamber unit and the third chamber unit are adjacent to each other, a second partition wall being between the first chamber unit and the third chamber unit, and the third chamber unit including at least one rib extending in a lengthwise direction of the third chamber unit.

15. The electric bike as claimed in claim 14, wherein the third chamber unit is partitioned into a plurality of areas by the at least one rib, and the second partition wall includes a plurality of holes through which the plurality of areas of the third chamber unit and the first chamber unit are fluidically connected to each other.

16. The electric bike as claimed in claim 11, wherein the first chamber unit and the second chamber unit are adjacent to each other, the first partition wall being between the first chamber unit and the second chamber unit, and the second chamber unit including at least one rib extends in a lengthwise direction of the second chamber unit.

17. The electric bike as claimed in claim 16, wherein the second chamber unit is partitioned into a plurality of areas by the at least one rib, and the second chamber unit includes holes corresponding to the plurality of areas and through which each of the plurality of areas is fluidically connected to the exterior of the frame.

18. A frame for a bike, the frame comprising:
a hollow chamber; and
a first partition wall that partitions the hollow chamber into a first chamber unit and a second chamber unit, the first partition wall including a plurality of openings through which the second chamber unit is in fluid communication with the first chamber unit; and
a second partition wall that partitions the hollow chamber to include a third chamber unit, the first chamber unit being between the second chamber unit and the third chamber unit, wherein:
the first chamber unit includes an opening in a first side of the first chamber unit and an accommodation space to accommodate a battery pack, the first partition wall separating the accommodation space from the second chamber unit,
the second chamber unit includes at least one hole through a first side of the second chamber unit, an interior of the second chamber unit and an exterior of the frame for the bike being in fluid communication through the at least one hole, and
the third chamber unit includes at least one rib that extends in a lengthwise direction of the third chamber unit, the third chamber unit being partitioned into a plurality of areas by the at least one rib.

* * * * *